(12) United States Patent
Saxena et al.

(10) Patent No.: US 10,338,915 B2
(45) Date of Patent: Jul. 2, 2019

(54) AUTOMATED IDENTIFICATION OF CODE DEPENDENCY

(71) Applicant: SAP SE, Walldorf (DE)

(72) Inventors: Setu Saxena, Bhopal (IN); Akhilesh Kumar, Darbhanga (IN); Christoph Vehns, Mannheim (DE)

(73) Assignee: SAP SE, Walldorf (DE)

( * ) Notice: Subject to any disclaimer, the term of this patent is extended or adjusted under 35 U.S.C. 154(b) by 259 days.

(21) Appl. No.: 15/349,301

(22) Filed: Nov. 11, 2016

(65) Prior Publication Data

US 2018/0136930 A1     May 17, 2018

(51) Int. Cl.
| | | |
|---|---|---|
| *G06F 8/65* | (2018.01) | |
| *G06F 8/75* | (2018.01) | |
| *G06F 8/658* | (2018.01) | |

(52) U.S. Cl.
CPC .............. *G06F 8/658* (2018.02); *G06F 8/65* (2013.01); *G06F 8/75* (2013.01)

(58) Field of Classification Search
CPC .............. G06F 8/65; G06F 8/75; G06F 8/658
USPC ........................................................ 717/170
See application file for complete search history.

(56) References Cited

U.S. PATENT DOCUMENTS

| | | | | |
|---|---|---|---|---|
| 6,202,207 | B1 * | 3/2001 | Donohue ................. | G06F 8/65 705/59 |
| 8,429,459 | B2 * | 4/2013 | Birakoglu ............ | G06F 11/368 714/38.1 |
| 8,966,442 | B2 | 2/2015 | Eska et al. | |
| 2013/0055235 | A1 * | 2/2013 | Eska ........................ | G06F 8/751 717/173 |
| 2013/0185701 | A1 * | 7/2013 | Martick .................... | G06F 8/71 717/120 |
| 2014/0196020 | A1 * | 7/2014 | Shetty ..................... | G06F 8/658 717/171 |
| 2014/0237463 | A1 * | 8/2014 | Sriram ....................... | G06F 8/65 717/172 |
| 2015/0178063 | A1 * | 6/2015 | Narkinsky .............. | G06F 8/658 717/168 |
| 2016/0179496 | A1 * | 6/2016 | Fauteck .................... | G06F 8/65 717/169 |
| 2018/0136930 | A1 * | 5/2018 | Saxena ...................... | G06F 8/65 |

OTHER PUBLICATIONS

Kosegi et al., SP Change and Transport Management 3rd Ed., Galileo Press (2008) retrieved from https://www.booklooker.de/B%C3%BCcher/K%C3%B6segi-Armin-Kosegi+SAP-%C3%84nderungs-und-Transportnnanagennent/id/A01Qts0001ZZJ and https://www.thali.ch/files/Shop/Documents/013744_Leseprobe.pdf on Aug. 21, 2018.*

"Technical Details on Correction Instructions," retrieved from https://help.sap.com/saphelp_nw74/helpdata/en/48/b41a47fc096ff4e10000000a42189b/content.htm, on or before Nov. 10, 2016, 4 pages.

(Continued)

*Primary Examiner* — Duy Khuong T Nguyen
*Assistant Examiner* — Theodore E Hebert
(74) *Attorney, Agent, or Firm* — Klarquist Sparkman, LLP

(57) ABSTRACT

A first code update is received having a first code change. It is determined whether the first code change of the first code update can be implemented on a first reference code version on which at least one code change of a second code update has been undone.

20 Claims, 13 Drawing Sheets

(56) References Cited

OTHER PUBLICATIONS

"What is Transport Request? How to Import/Export it & check logs?" retrieved from http://www.guru99.com/what-is-transport-request-how-to-importexport-it-check-logs.html, on or before Nov. 10, 2016, 16 pages.

SAP Note Transport-Based Correction Instructions, retrieved from https://help.sap.com/saphelp_nw74/helpdata/en/81/a0376ed9b64194b8ecff6f02f32652/content.htm?frameset=/en/48/b41a59fc096ff4e10000000a42189b/frameset.htm&current_toc=/en/29/a28dd34688450faf5ef09c0b8b8a48/plain.htm&node_id=44&show_children=false, on or before Nov. 10, 2016, 3 pages.

* cited by examiner

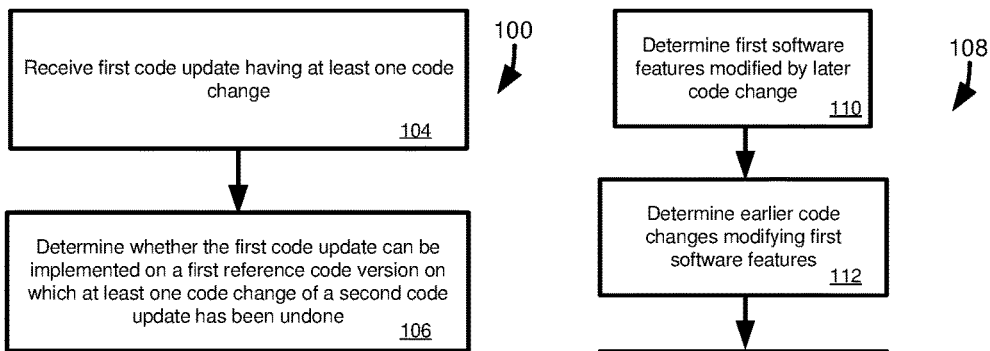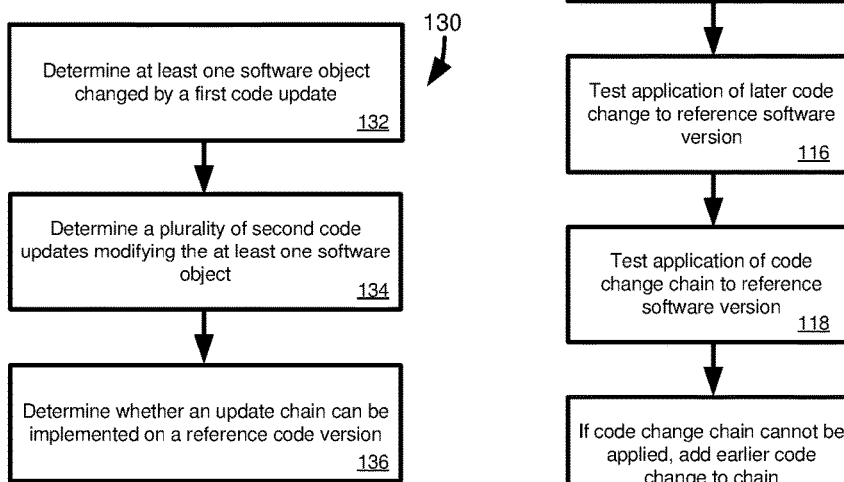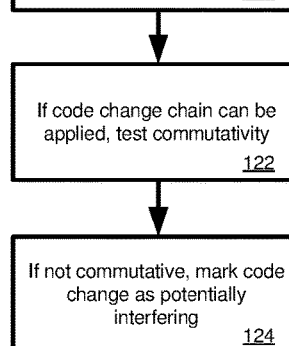

AUTOMATED IDENTIFICATION OF CODE DEPENDENCY

FIELD

The present disclosure generally relates to automated identification of dependencies between code versions. Particular implementations relate to determining whether a first code version is dependent on, independent of, or potentially interfering with, a second code version.

BACKGROUND

In some cases, software can be updated by adding a file to, or deleting files from, an existing installation. When the files have the same name or identifier between software versions, the old file can be overwritten with the new file version.

In other cases, software can be updated by modifying the contents of an existing file. For example, lines of code in a file can be removed, modified, added, or otherwise changed in (such as being moved within) the file.

In some cases, software may have a primary version, such as a version in which the software was originally released, or a version representing a significant update to the software. Between versions, smaller updates, or code changes, may be made to a software version, such as to correct errors, add features, or improve performance.

Whether a particular software update or other code change can be applied to a particular software installation can depend on both the base version of the software and any incremental updates that have been applied. That is, later code changes may modify, use, or otherwise rely upon earlier code changes. If the particular software installation does not have the necessary base version or incremental updates for the particular software update to be applied, in some cases, the base version and earlier incremental updates can be first applied to the particular software installation.

However, fully updating the software installation may not be ideal. For example, it may take significant time for the updates to be applied to the software installation. During the update process, the software may not be available, which may inconvenience users. Updating the software may also require technical expertise, which can require paying for technical services or using in house technical personnel. Changes to software code may also cause changes in functionality or performance that may reduce its usefulness. For example, a fix to one feature of interest to a customer may modify another feature in a way that is not desired by the customer. Thus, room for improvement remains in the technical area of updating software.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the automated identification of a relationship between first and second code versions, such as identifying code dependencies. According to a particular method, a first code update is received having a first code change. It is determined whether the first code change of the first code update can be implemented on a first reference code version on which at least one code change of a second code update has been undone.

According to another method, a first code update is received having at least one code change. It is determined whether the first code update can be implemented on a first reference code version on which at least one code change of a second code update has been undone. It is determined whether an update chain that includes the first code update and a third code update having at least one code change can be implemented on the first reference code version. It is determined whether the update chain can be implemented on a second reference code version that includes the at least one code change of the second code update. It is determined whether the at least one code change of the second code update can be implemented on a third reference code version that includes code changes of the update chain.

According to a further method, at least one software object changed by a first code update is determined. A plurality of second code updates modifying the at least one software object are determined. For each of the plurality of second code updates, it is determined whether an update chain that includes the first code update and at least one second code update can be implemented on a reference code version on which at least one code change of another second code update has been undone.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 1A is a flowchart of a method for determining code dependencies according to an embodiment of the present disclosure.

FIG. 1B is a flowchart of a method for determining code dependencies according to an embodiment of the present disclosure.

FIG. 1C is a flowchart of a method for determining code dependencies according to an embodiment of the present disclosure.

DETAILED DESCRIPTION

Example 1

Overview

Figure 2:
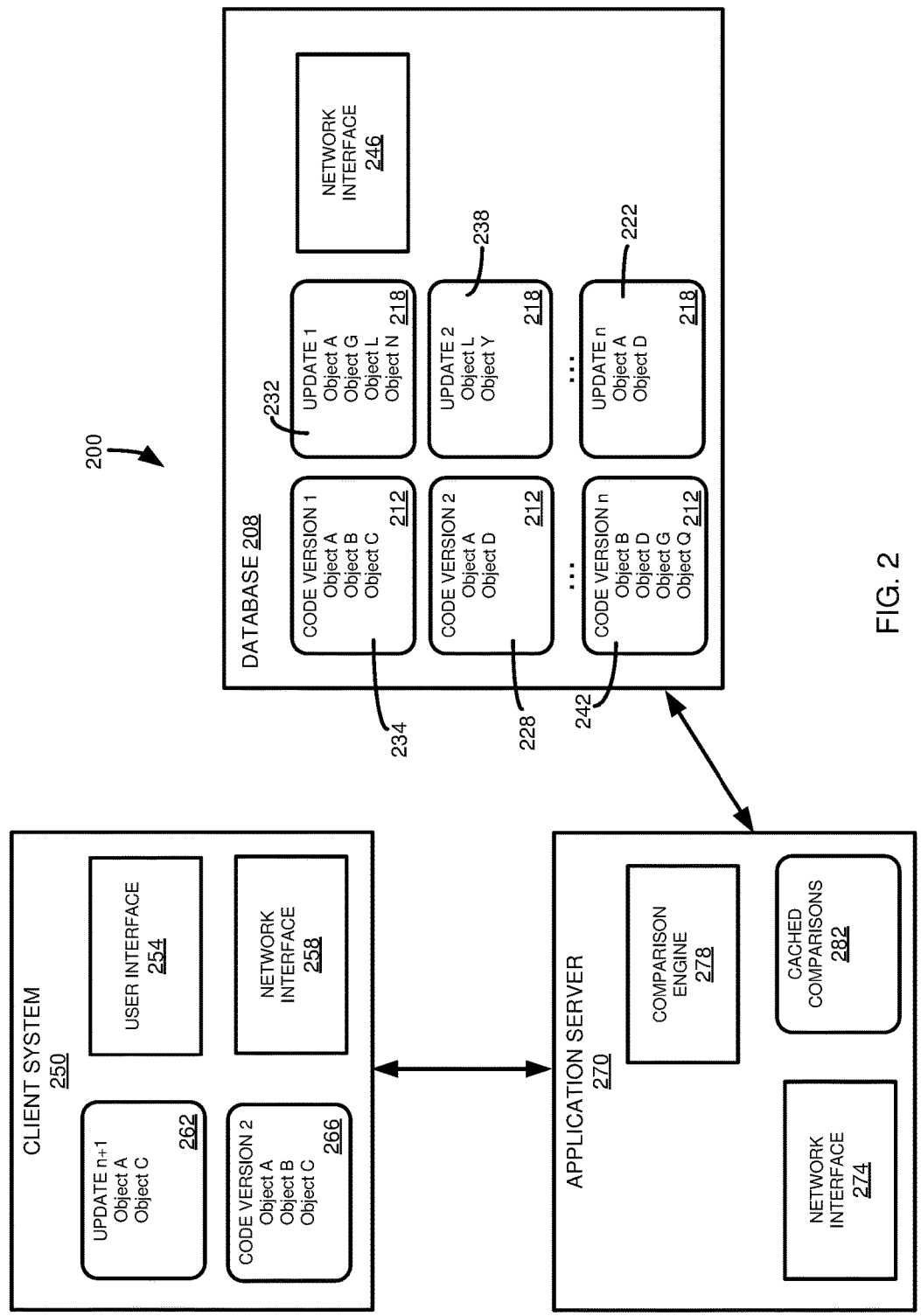
FIG. 2 is a block diagram illustrating an example software architecture in which an application server having a comparison engine can communicate with a database and a client system to determine code dependencies according to an embodiment of the present disclosure.

In some cases, software can be updated by adding a file to, or deleting files from, an existing installation. When the files have the same name or identifier between software versions, the old file can be overwritten with the new file version.

In other cases, software can be updated by modifying the contents of an existing file. For example, lines of code in a file can be removed, modified, added, or otherwise changed in (such as being moved within) the file.

In some cases, software may have a primary version, such as a version in which the software was originally released, or a version representing a significant update to the software. Between versions, smaller updates, or code changes, may be made to a software version, such as to correct errors, add features, or improve performance. The terms "code changes" and "updates" are generally used interchangeably in the present disclosure, unless the context or disclosure indicates otherwise. Updates generally refer to the incremental improvement of a program through code changes. However, the present disclosure is not limited to code changes that represent updates. For example, a user may wish to determine whether code changes can be implemented to remove features or reduce performance, such as if the program is desired to be executed on a system having fewer resources than recommended for a current code version. Thus, code changes, including updates, need not necessarily represent "upgrades" to a program. In at least some cases, code changes or updates represent a collection of one or more individual code changes that are intended to be applied together, such as in an update package.

Whether a particular code change can be applied to a particular software installation can depend on both the base version of the software and any incremental updates or changes that have been applied. That is, later code changes may modify, use, or otherwise rely upon earlier code changes. If the particular software installation does not have the necessary base version or incremental updates for the particular software update to be applied, in some cases, the base version and earlier incremental updates can first be applied to the software installation.

However, updating the software installation may not be ideal. For example, it may take significant time for the updates to be applied to the software installation. During the update process, the software may not be available, which may inconvenience users. Updating the software may also require technical expertise, which can require paying for technical services or using in house technical personnel. Software updates may also cause changes in functionality or performance that may reduce its usefulness. For example, a fix to one feature of interest to a customer may modify another feature in a way that is not desired by the customer. Thus, room for improvement remains in the technical area of updating software.

In some cases, for installation of a particular incremental code change to a particular software installation, it may be possible to determine only those earlier incremental or base version code changes that are necessary for a later code change. For example, a user could manually investigate code changes between software versions to determine which earlier updates are required for a later update. However, this process can be tedious even for small programs and comparatively few updates. For larger programs, or larger numbers of updates, the process can quickly become unmanageable. Alternatively, a user could try installing the particular update with various earlier updates and determine which earlier updates are necessary for implementation of the later update by noting when the update process fails (or produces erroneous code). Again, this process can quickly become unmanageable for large numbers of updates, and determining erroneous code may not be trivial.

To help overcome these technical problems, the present disclosure provides for automated detection of earlier software updates necessary for the installation of a later incremental update. FIG. 1A provides a flowchart of a general method 100 for determining code dependencies. At 104, a first code update is received having at least one code change. At 106, it is determined whether the first code update can be implemented on a first reference code version on which at least one code change of a second code update has been undone.

FIG. 1B presents a flowchart of a particular implementation 108 of the method 100. At 110, first software features (such as classes, methods, data members, packages, etc.) are identified which are to be modified by a later code change. Modified software features can include software features that are added, deleted, or modified compared with another software version. Modified software features can include those who have lines of code added, removed, or changed compared with another code version.

At 112, earlier code changes are identified which include the first software features. A reference software version is obtained, or created, at 114, that removes the changes made by the earlier code change. At 116, the later code change is then attempted to be applied to the reference version. If the later code change can be applied, the earlier code change is marked as potentially overlapping, or interfering with, the later code change.

An update chain can be formed from the later code change and any earlier code changes that were determined to be necessary or potentially overlapping. So, the update chain can include code changes identified as potentially overlapping at 116. At 118, the update chain can be attempted to be installed on the reference version. If the update chain cannot be installed, then the earlier code change can be determined to be necessary, and added to the update chain at 120.

However, even if the update chain can be applied, there can still be differences in the code resulting from applying the update chain and earlier code changes in differing orders. To check for this possibility, at 122, the update chain and later code changes can be tested to see if they are implementable on the reference version in both possible orders-chain followed by later code change, and later code change followed by chain. If the chain and later code change are implementable in both orders, then the chain and later code change can be said to be commutative, and the earlier code change can be marked as not required for successful installation of the chain. If the chain and earlier code change can be installed in one order, but not the other, the earlier code change can be identified as potentially interfering, or otherwise interacting or overlapping with, the chain, and added to the chain at 124. This process can repeated for all possible code changes to all of the software features in common between the later code change and at least one earlier code change.

FIG. 1C is a flowchart of a method 130 that can be used to determine code dependencies. At 132, at least one software object changed by a first code update is determined. A plurality of second code updates modifying the at least one software object are determined at 134. At 136, it is determined with an update chain including the first code update and at least one of the second code updates can be implemented on a reference code version that includes the changes of another of the second code updates.

Example 2

Example Software Architecture

FIG. 2 is a block diagram providing an example software architecture 200 that can be used in implementing at least certain embodiments of the present disclosure. The architecture 200 includes a database 208 or other data repository or data storage. The database 208 can be, or can be part of, a software configuration management (SCM) system. In some cases, the database 208 can be the HANA database system of SAP SE of Walldorf, Germany.

The database 208 can store code versions 212. Code versions 212 can represent different base versions of a program, or a version produced by applying one or more updates to a base version. Each of the code versions 212 can include zero or more, such as one or more, software objects or features (e.g., classes, methods, packages, etc.). The database 208 can also store code updates, or code changes, 218. Code updates 218 can include changes to zero or more, such as one or more software objects or features. In some cases, an update 218, such as update 222, maybe update all of the software objects in a code version 212, such as code version 228. In other cases, an update 218, such as update 232, may update a portion of the software objects of a code version 212, such as code version 234. In yet further cases, an update 218, such as update 238, may not update any software objects in a particular code version 212, such as code version 242.

The database 208 may include additional components, such as a network interface 246 to facilitate communication with other components of the architecture 200. The database 208 may include more or fewer features than shown. In addition, in some cases, the database 208, or code versions 212 and updates 218, can be part of, or the functionality carried out by, another component of the architecture 200.

The architecture 200 can also include a client system 250. The client system 250 can include a user interface 254, which can include functionality to display information to, and receive information from, a user. The client system 250 can include a network interface 258, which may be used to communicate with other components of the architecture 200, such as the database 208.

The client system 250 can also include one or mode code updates 262 and one or more code versions 266. In some cases, the code updates 262 can include code updates being developed by a user, including completed updates to be tested for code dependencies, or updates still in the development process which the user desires to have analyzed. In further cases, the code updates 262 can include earlier code updates to a program or other code being modified by the user. The code versions 266 can be prior code versions or a new code version generated by applying an update 262, such as an update being developed by the user, to a prior code version.

The client system 250 can be used to create, select, and apply code updates 262 to code versions 266. In at least some cases, at least some of the code updates 262 and code versions 266 can also be stored in the database 208. In further cases, at least some of the code updates 262 and code versions 266 are not stored in the database 208.

The architecture 200 can include an application server 270. The application server 270 can include a network interface 274 for communicating with other components of the architecture 200, such as the database 208 and the client system 250. The application server 270 can also include a comparison engine 278, which can be used to execute software carrying out aspects of the present disclosure for automatically determining predicate updates necessary for the installation of a particular update. In at least some cases, the application server 270 can include a cache 282 where the results of previously executed comparisons can be stored.

The architecture 200 can include more or fewer components than shown, and may be organized in other manners. For example, functionality of a particular component can be carried out by another component. In addition, in at least some cases, functionality can be carried out using multiple components. In a specific example, the functionality of two or more of the database 208, the client computing system 250, and the application server 270 can be combined in a single system.

In specific embodiments, updates can be propagated through the architecture 200, such between the database 208, the client system 250, and the application server 270, using the SAP HANA TRANSPORT FOR ABAP system of SAP SE of Walldorf, Germany. Similarly, in a specific embodiment, the code versions 212, 266, and the updates 218, 262 can be created and manipulated using the ABAP WORKBENCH of SAP SE of Walldorf, Germany.

Example 3

Example Determination of Update Installability

As explained above, in at least some aspects, the present disclosure provides for determining predicate code changes for a later code change by determining whether the later update can be installed on a reference version of the software. The reference version of the software can be a version that does not include changes made be a particular earlier code change. This process is depicted schematically in FIG. 3, and can be carried out, in particular examples, using the comparison engine 278 of FIG. 2.

Figure 3:
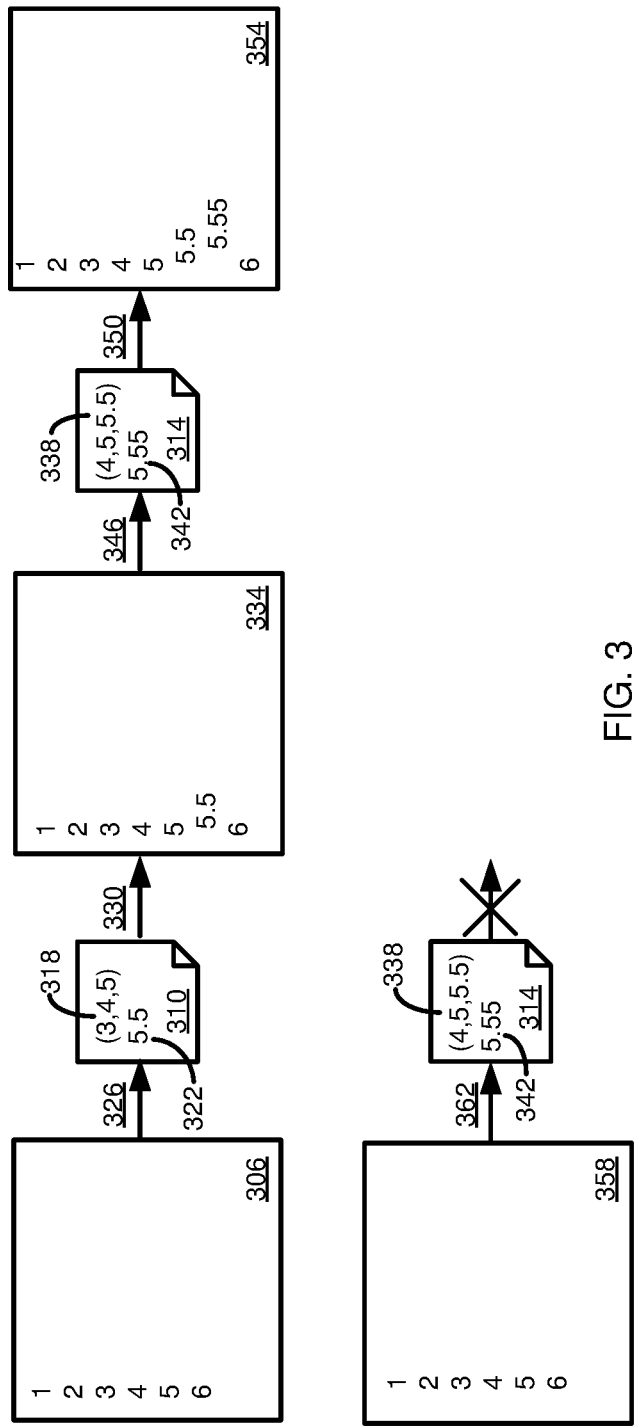
FIG. 3 is a diagram schematically depicting how multiple code changes can create code dependencies.

FIG. 3 illustrates a first base software version 306, a first update 310, and a second update 314. The first base software version 306 includes a software object with elements 1-6. The first update 310 includes a context identifier 318 (elements 3, 4, 5) that are used to determine whether the update can be applied to a particular software version. The first update 310 also includes an update instruction 322, such as to insert element 5.5 after the context identifiers.

In process 326, it is determined whether the first update 310 can be applied to the first base software version 306. The code for the first base version 306 can be scanned, and elements 3, 4, 5 of context identifier 318 located in the correct sequence. The first update 310 can be applied to the first base version 306 in process 330. Context identifier elements 3, 4, 5 are located in the code of the base version 306, and element 5.5 inserted after them, to produce first updated code version 334.

The second update 314 includes a context identifier 338 having elements 4, 5, 5.5. The second update 314 includes an update instruction 342 to insert element 5.55 after element 5. In process 346, it is determined whether the second update 314 can be applied to the first updated code version 334. It is determined that the first updated code version 334 includes the requisite context identifier block, and so, in process 350, element 5.55 is inserted after element 5.5 to produce second updated code version 354.

A second base code version 358 can include elements 1-6, like first base version 306. A user may wish to install second update 314 on the second base version 358. For example, it may be known that the second update 314 corrects a software error being experienced by the user of base code version 358. In process 362, the code of the second base version 358 is scanned to determine whether the elements of context identifier 338 can be identified. In this case, elements 3, 4, 5 are present in the second base code version 358, not the required elements of 4, 5, 5.5. Thus, it is determined that second update 314 cannot currently be installed on the second base version 358. That is, in order to install the second update 314, the first update 310 would first need to be installed on the second base code version 358.

Example 4

Example Determination of Update Commutativity

As explained above, in at least some aspects, the present disclosure provides for determining predicate updates for a later update by determining whether a later update and an earlier update are commutative. This process is depicted schematically in FIG. 4, and can be carried out, in particular examples, using the comparison engine 278 of FIG. 2.

Figure 4:
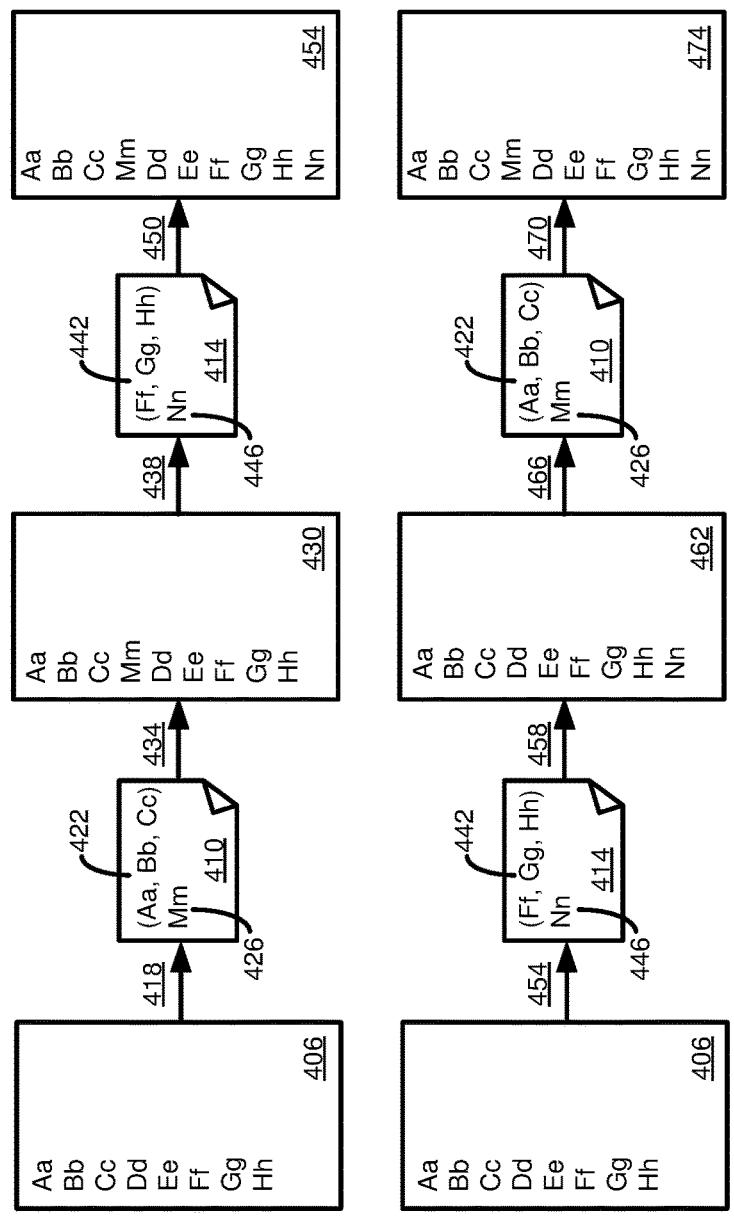
FIG. 4 is a diagram schematically depicting how multiple code changes can be independent.

FIG. 4 illustrates a base software version 406, a first update 410, and a second update 414. In process 418, it is determined whether the first update 410 can be applied to the base software version 406. A context identifier block 422 of the first update 410, elements Aa, Bb, and Cc, are identified in the base version 406. Thus, the update instruction 426 of the first update 410, insertion of element Mm, can be carried out to produce a first updated software version 430 in process 434.

In process 438, it is determined whether the second update 414 can be applied to the first updated software version 430. The context identifier block 442, elements Ff, Gg, and Hh, are identified in the first updated version 430. Thus, the update instruction 446 of the second update, insertion of element Nn, can be carried out in process 450 to provide a second updated software version 454. Thus, the first and second updates 410, 414 can be applied, in that order, to the base software version 406.

Next it can be determined whether the updates can be applied commutatively. That is, can the first update 410 be applied after the second update 414 has been applied. In process 454, it is determined whether the second update 414 can be applied to the base software version 406. The context identifier block 442 is identified in the base software version 406. Thus, the update instruction 446 can be applied in process 458 to provide a third updated software version 462.

In process 466, it is determined whether the first update 410 can be applied to the third updated software version 462. The context identifier block 422 is identified in the third updated software version 462, and so the update instruction 426 can be applied in process 470 to produce a fourth updated software version 474.

Because the first and second updates 410, 414 can be applied to the base software version 406 in any order, they can be said to be commutative. As such, neither update is needed in order for the other to be installed.

Figure 5:
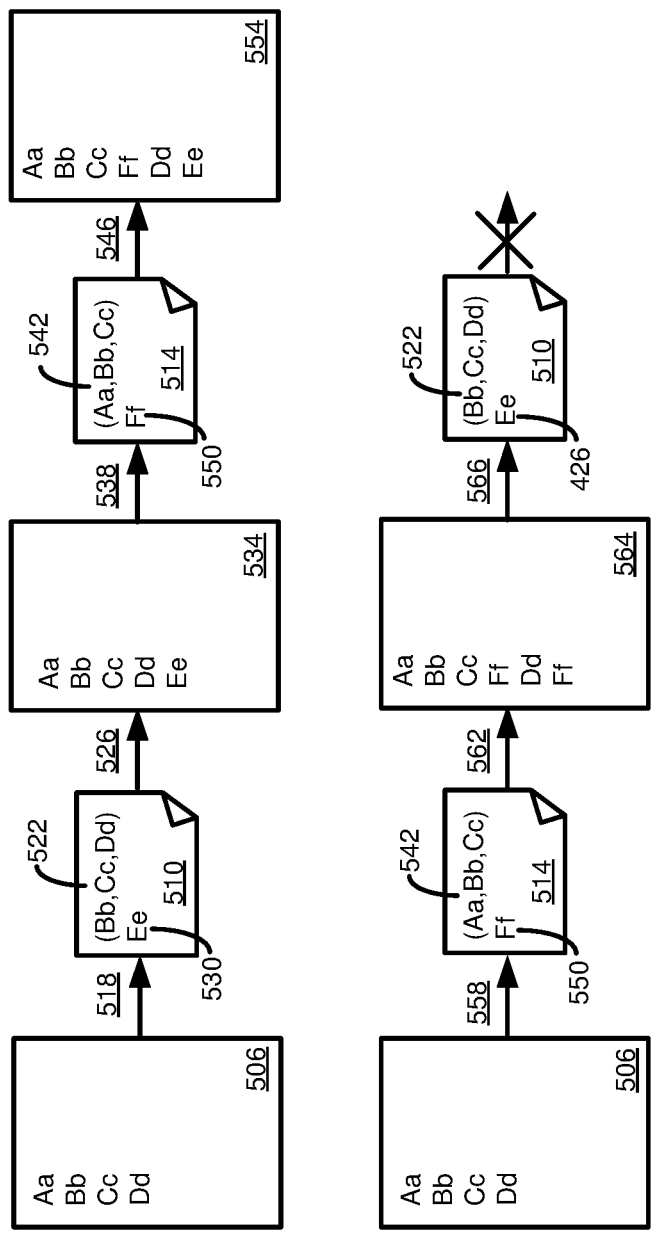
FIG. 5 is a diagram schematically depicting how multiple code changes can create code dependencies.

While FIG. 3 illustrates the situation where a later update cannot be applied without an earlier update, and FIG. 4 illustrates complete independence of updates, FIG. 5 illustrates a scenario where updates can be applied in a first order, but not in the reverse order, which can be carried out, in particular examples, using the comparison engine 278 of FIG. 2.

FIG. 5 illustrates a base software version 506, a first update 510, and a second update 514. In process 518, it is determined whether the first update 510 can be applied to the base software version 506. The context identifier block 522 of the first update 510, elements Bb, Cc, and Dd, is present in the base software version 506. Accordingly, in process 526, the update instruction 530, insertion of element Ee, can be carried out to produce a first updated software version 534.

In process 538, it is determined whether the second update 514 can be applied to the first updated software version 534. The context identifier block 542 of the second update 514, having elements Aa, Bb, and Cc, is present in the first updated software version 534. Accordingly, in process 546, the update instruction 550 of the second update 514, insertion of element Ff, can be carried out to produce a second updated software version 554.

Considering the application of the second update 514 followed by application of the first update 510, in process 558, it is determined whether the second update can be applied to the base software version 506. The context identifier block 542 of the second update 514 is present in the base software version 506, and so the update instruction 550 of the second update can be applied in process 562 to produce a third updated software version 564.

In process 566, it is determined whether the first update 510 can be applied to the third updated software version 564. In this case, the context identifier block 522 of the first update 510, elements Bb, Cc, Dd, is not present in the third updated software version 564, as the requisite elements were previously modified by the second update 514. Thus, the first update 510 cannot be applied to the third updated software version 564.

Because the first and second updates 510, 514 may overlap or interfere with each other, in at least some cases, an indication may be provided to a user that problems may be encountered if both updates 510, 514 are installed. In a particular example, updates can be color-coded to indicate whether a particular earlier update is necessary, unnecessary, or potentially interfering with a later update. For example, necessary updates, where a later update cannot be installed without the earlier update (as illustrated in FIG. 3), the update can be marked in red. Where the updates are completely commutative, or independent, such as shown in FIG. 4, the earlier update can be marked in green. A potentially interfering update, such as shown in FIG. 5, can be marked in a different color, such as yellow. Of course, other visual (or other) indications can be provided to indicate to a user the dependency status of a particular update on an earlier update.

Example 5

Example Change Implementation and De-Implementation Using Context, Delete, and Insert Blocks In updating software, lines of code may be added, changed, or deleted compared with a reference version. It is desirable to have a system whereby software having relevant code can be located, and changes made at the correct location. In addition, in at least some embodiments, determining whether an update is necessary, or potentially interfering, can depend on a comparison that involves applying a later update, or a chain that includes the later update and one or more earlier updates, to a reference software version that represents the code before the earlier update being analyzed was applied. In some cases, the reference software version may exist, and thus the comparison can be made without additional steps. In other cases, it may be necessary or desirable to obtain the reference software version by undoing the changes made the earlier update.

Figure 6:
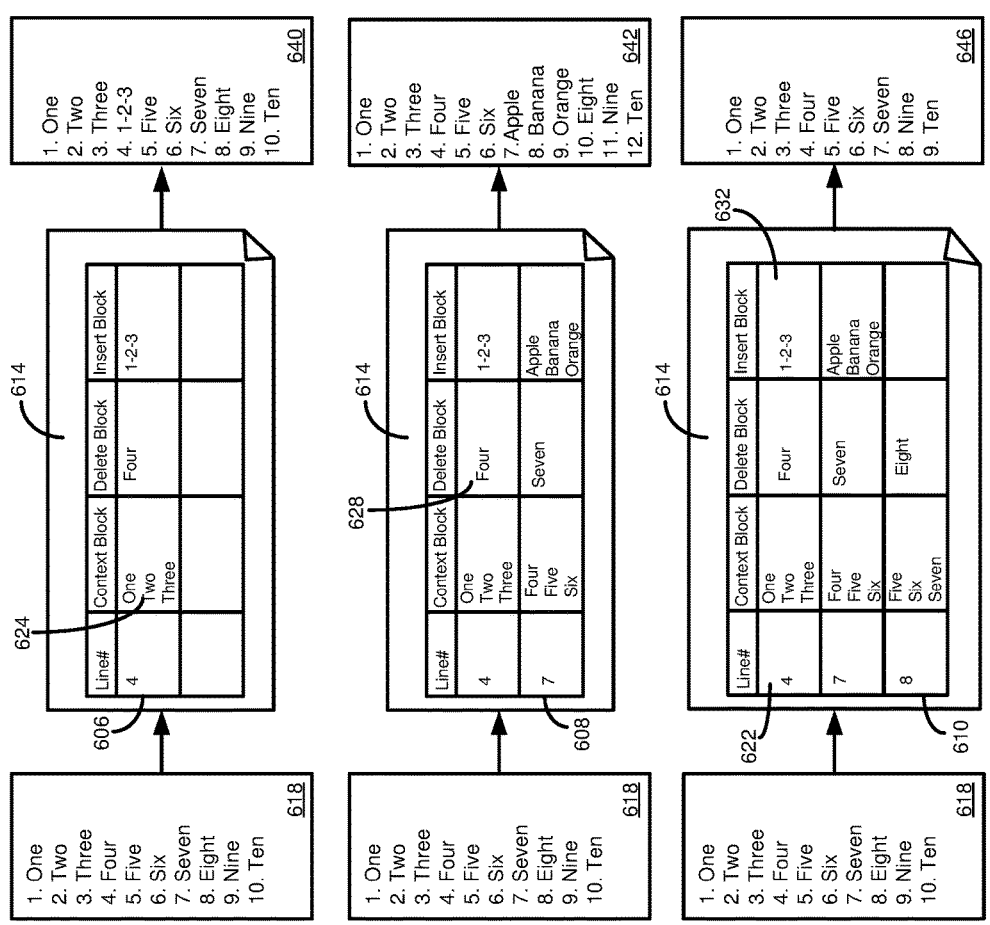
FIG. 6 is a diagram schematically depicting how code changes can be executed using instructions having context, delete, and insert blocks.

FIG. 6 schematically illustrates the effects of applying individual update instructions 606, 608, 610 of an update 614 to a base software version 618, such as using the comparison engine 278 of FIG. 2. The base software version 618 includes ten lines of code, holding, respectively, elements one through ten. Update 614 is organized into a reference line of code 622, a context block 624, a delete block 628, and an insert block 632. Reference line of code 622 identifies a particular line of code that is to be modified. Context block 624 contains lookup information, or elements, that can be used to determine whether the reference line of code 622 is the present in the correct context for the update 614 to be applied. That is, while all versions of a particular piece of software may have a line 20, the content of the surrounding lines of code may differ between the versions. Although three lookup elements are shown in FIG. 6, in practice, more or fewer lookup elements may be used.

Delete block 628 can include code to be deleted from an earlier code version. Insert block 632 can include code to be added to an earlier code version. In some cases, code can be both added and deleted. In other cases, code can be either added or deleted. In other examples, the update process can be carried out in a different manner. For example, update instructions could include changes to be made to one or more lines of code, without deleting the reference lines or adding new code lines.

This Example 5 describes context, delete, and insert blocks 624, 628, 632 in terms of simple words and numbers for simplicity of presentation. However, it should be appreciated that in practice, the changes can include portions of code, such as source code. For instance, an example context block 624 can be:

```
ELSEIF (NOT (ls_sos_list-ctr_hdf_guid IS INITIAL) AND
    NOT (ls_sos_list-ctr_item_guid IS INITIAL)).
    cs_item-ctr_hdr_guid=ls_sos_list-ctr_hdr_guid.
    cs_item-ctr_guid=ls_sos_list-ctr_item_guid.
```

An example delete block 628 can be:

```
IF NOT ls_sos_list-product IS INITIAL, "in case it' s not a product
category contract.
We clear the price.
CLEAR: cs_item-gross_price, cs_item-price.
ENDIF.
```

An example insert block 632 can be:

```
*no need for this code because the pricing engine takes care of
determining the price.
* IF NOT ls_sos_list-product IS INITIAL, "in case it's not a product
category contract. We clear the price.
* CLEAR: cs_item-gross_price, cs_item-price.
* ENDIF.
```

So, in operation, if the relevant context block 624 is identified, the code in the delete block 628 is replaced with the code in the insert block 632, which, in the example above, comments out the deleted code, in addition to inserting a comment explaining why the code was commented out.

Update instruction 606 references line 4, and the context is identified by the lookups one, two, and three. If the context block is present, the instruction indicates that element four should be deleted, and element 1-2-3 added. Applying update instruction 606 to base software version 618, provides a first updated software version 640. In line 4 of the first updated software version 640, element four has been deleted, and 1-2-3 inserted in its place.

Update instruction 608 references line 7, and the context is indicated by lookup elements four, five, and six. If the context block 624 is present in the base software version 618, the instruction 608 indicates that element seven should be deleted, and the separate elements, Apple, Banana, Orange added. Applying update instruction 608 to base software version 618 provides a second updated software version 642. Element seven of line 7 has been replaced by Apple. The additional elements Banana and Orange have been inserted as new lines in the code, shifting the following code lines down by two.

Update instruction 610 references line 8, and the context is indicated by lookup elements five, six, and seven. If the context block 624 is present, line 8 of the code is to be deleted, with nothing being inserted in its place, as indicated by the empty insert block 632. Applying update instruction 610 to base software version 618 provides a third updated software version 646. Line 8 of the code, having element eight, has been removed, shifting the remaining lines of code up by one.

Figure 7:
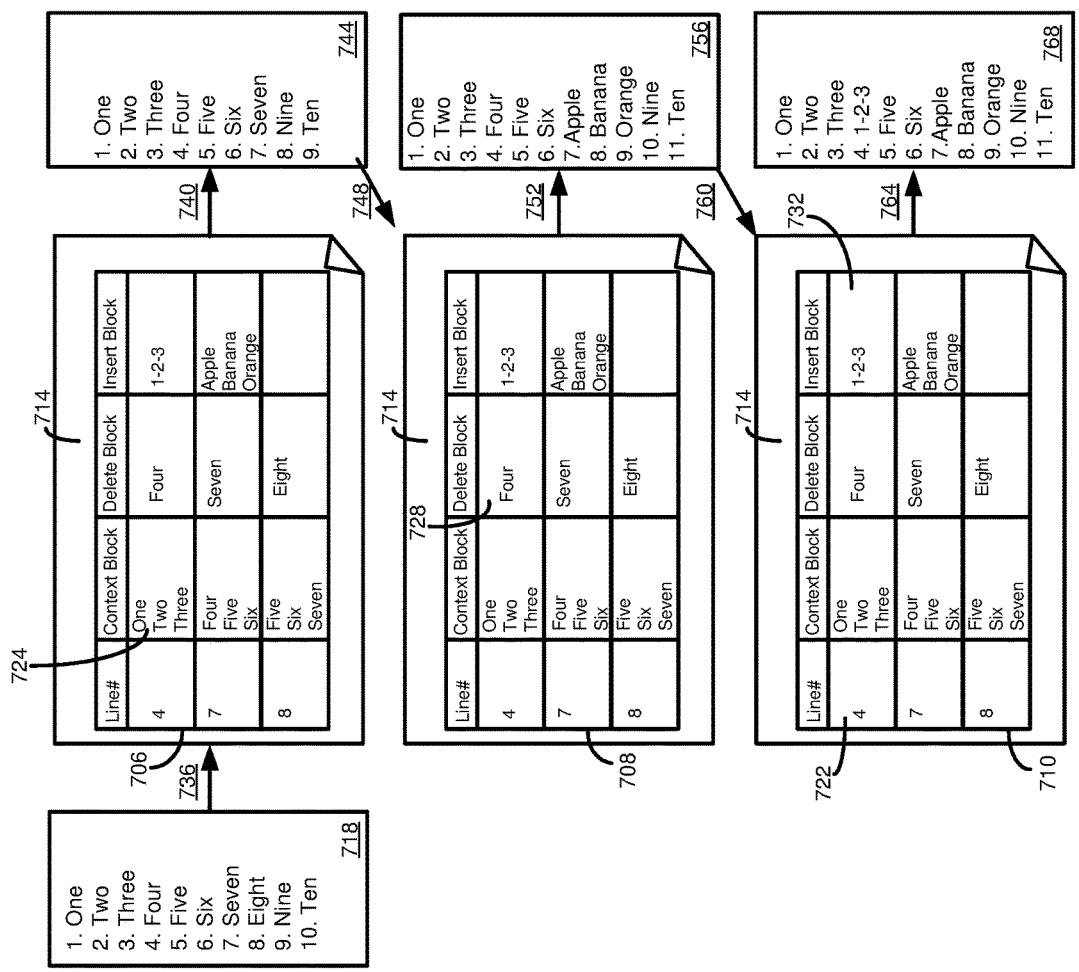
FIG. 7 is a diagram schematically depicting how code changes can be sequentially executed using instructions having context, delete, and insert blocks to produce an updated code version.

While FIG. 6 illustrates the effect of applying individual update instructions to a base software version, FIG. 7 illustrates the effect of sequentially applying update instructions 706, 708, 710 of an update 714 to a base software version 718, such as using the comparison engine 278 of FIG. 2. As with the update 614 of FIG. 6, the update 714 can include a reference line of code 722, a context block 724, a delete block 728, and an insert block 732.

In some cases, the update instructions 706, 708, 710 can be applied in a particular order to ensure that the appropriate end result is achieved. In a specific example, the update instructions 706, 708, 710 can be applied starting with the largest line number, and then applying the update instructions sequentially by decreasing line numbers. In other cases the update instructions 706, 708, 710 can be applied in a different order. Or, all or a portion of the update instructions 706, 708, 710 can be applied concurrently. Although three update instructions 706, 708, 710 are shown, the update 714 can include a larger or smaller number of update instructions.

In process 736, it is determined, such as by the comparison engine 278 of FIG. 2, whether the update instruction 710 for line 8 can be applied to the base software version 718. The requisite lookup elements, five, six, seven, are present in the base software version 718. In process 740, update instruction 710 is applied the base software version 718 to provide a first updated software version 744. In the first updated software version 744, line 8, formerly with element eight, has been removed, and the remaining lines of code shifted up by one.

In process 748, it is determined whether the update instruction 708 for line 7 can be applied. The requisite lookup elements, four, five, six, are present in the first updated software version 744. In process 752, update instruction 708 is applied to the first updated software version 744 to provide a second updated software version 756. In second updated software version 756, application of the delete block 728 of the update instruction 708 results in removal of line 7, and its former element seven. Application of the insert block 732 of update instruction 708 results in Apple, Banana, and Orange inserted in place of former line 8, resulting in two additional lines of code, shifting the following lines of code down by two.

In process 760, it is determined whether the update instruction 706 for line 4 can be applied to the second updated software version 756. The requisite lookup elements, one, two, three, are present in the second updated software version 756. In process 764, the update instruction 706 is applied to the second updated software version 756 to provide a third updated software version 768. The delete block 728 of update instruction 706 indicates that element four of line 4 should be deleted, and the insert block 732 indicates that 1-2-3 should be added in its place. Thus, the third updated software version 768 represents the complete application of the update 714 to the base software version 718.

As explained above, in at least some cases it can be desirable to undue the changes made by an update in order to obtain or reproduce an earlier code version. When an update has been implemented as described above for FIG. 7, including applying update instructions from the highest code line number to the lowest code line number, the update can be undone, or de-implemented, by interchanging the insert and delete blocks and then applying the update instructions from lowest code line number to highest code line number. This process is described in conjunction with FIG. 8, and can be carried out, in particular examples, using the comparison engine 278 of FIG. 2.

Figure 8:
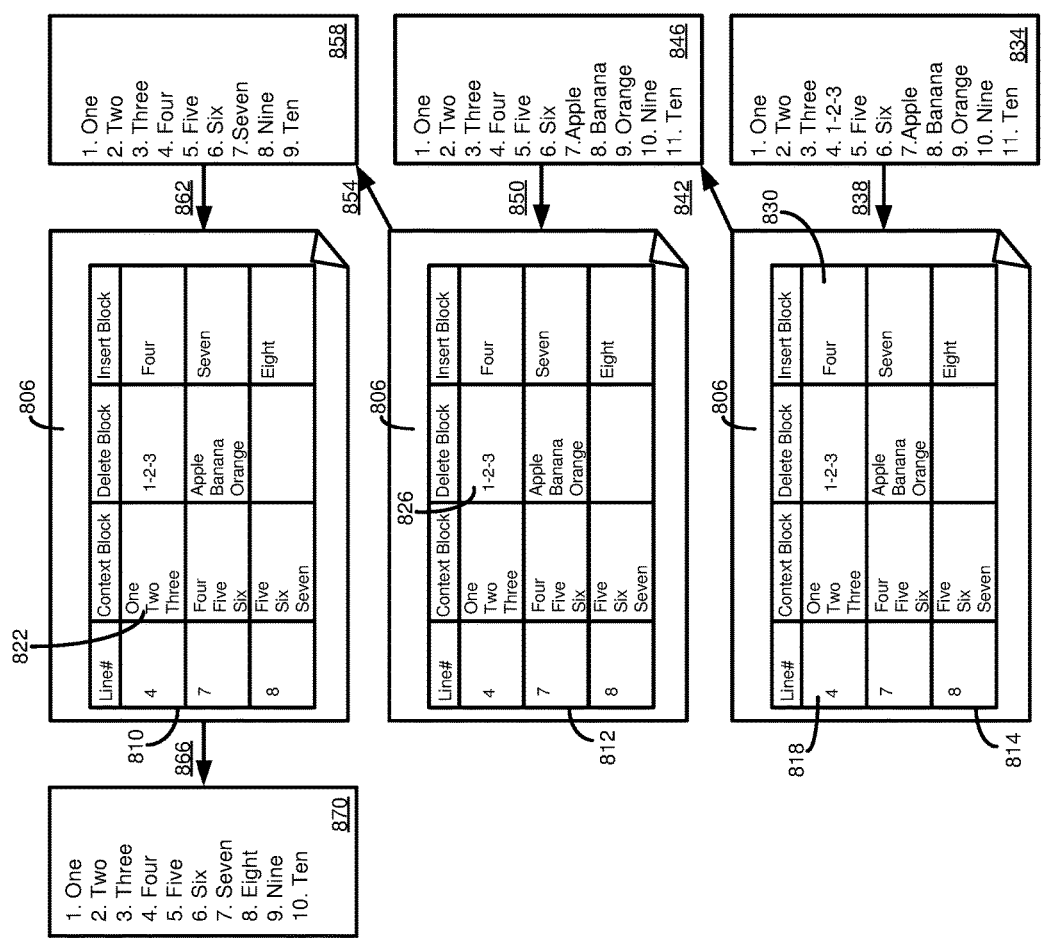
FIG. 8 is a diagram schematically depicting how code changes can be sequentially de-implemented using instructions having context, delete, and insert blocks to produce a code version with code changes de-implemented.

In FIG. 8, a rollback 806 includes rollback instructions 810, 812, 814. As with the update 614 of FIG. 6, the rollback 806 can include a reference line of code 818, a context block 822, a delete block 826, and an insert block 830. Rollback 806 can be obtained by taking the update 714 of FIG. 7 and interchanging the delete and insert blocks 728, 732. The rollback instructions 810, 812, 814 are applied to an updated software version 834 starting with instruction 810, having the lowest line number. In process 838, it is determined that the context elements of the update instruction 810, one, two, three, are present in the updated software version 834. According to the delete block 826 of the update instruction 810, in process 842, element 1-2-3 is removed, and element four is added according to the insert block 830, to produce first prior software version 846.

In process 850, it is determined that the context elements of the update instruction 812, elements Apple, Banana, Orange, are present in the first prior software version 846. According to the delete block 826 of update instruction 812, in process 854, Apple, Banana, Orange, is removed from the code, and element Seven added in its place. This results in the removal of two lines of code, and the production of second prior software version 858.

In process 862, it is determined that the context elements of update instruction 814, elements five, six, seven, are present in the second prior software version 858. Update instruction 814 has no delete block instructions, but element Eight is to be inserted. Inserting element Eight, in process 866, moves the remaining lines of code down by one, and produces third prior software version 870. Third prior software version 870 is identical to the base software version 718 of FIG. 7.

Although this Example 5 describes implementing and de-implementing code changes using context, insert, and delete blocks, in further examples two software versions (e.g., an earlier version and a later version where one (or more) updates has been applied to the earlier version) can be compared to generate/reproduce the contents of the update, such as context, insert, and delete blocks for reproducing the changes carried out in the update.

Example 6

Automated Determination of Code Dependency

Figure 9:
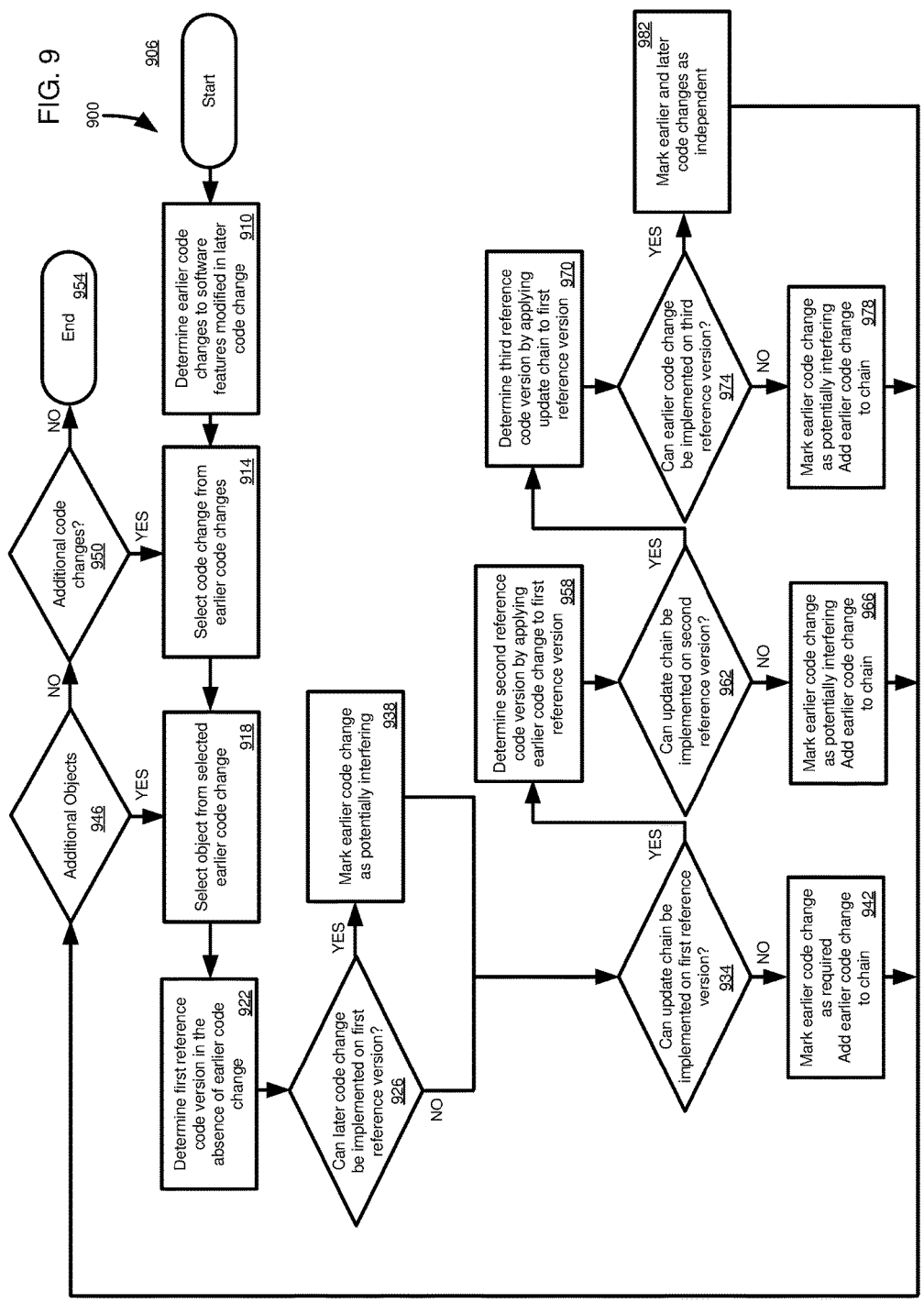
FIG. 9 is a flowchart of a method for identifying code dependencies according to an embodiment of the present disclosure.

FIG. 9 illustrates a method 900 for determining whether one or more earlier code changes are necessary for the application or installation of a later code change, and whether any code changes may potentially interfere with each other. In particular examples, all or a portion of the steps of FIG. 9 can be carried out by, or in conjunction with, the comparison engine 278 of FIG. 2. In further examples, the code changes, or updates, can be included in a package. In at least some aspects, "earlier" and "later" can refer to when a code change was, or is to be, implemented on a particular program, not necessarily when the code change was created. For instance, an earlier-written code change may not be determined to be potentially of interest until after a later-written code change has already been applied to a program. Thus, in this case, the earlier-written code change would be the "later" code change, and the later-written code change would be the "earlier" code change.

The method 900 begins at 906. At 910, one or more earlier code changes (c[k]) are identified that modified software features or objects modified by a later code change (c[l])) being analyzed for code dependency. In particular aspects, if an earlier code change modifies at least one software feature being modified by the later code change, it is included in the list of earlier code changes to be analyzed for potential dependencies.

A code change from the earlier code changes is selected for analysis at 914. The earlier code change can include one or more software objects or features that are changed in both the earlier and later code changes. One of the software objects is selected for analysis at 918.

At 922, a first reference code version (v[k−1]) is determined, which does not include the changes to the object being analyzed made by the earlier code change being analyzed. In some cases, the determining can involve undoing changes made by the earlier code change being analyzed. In other cases, the first reference version can simply be retrieved, such as from the database 208 of FIG. 2. At 926, it is determined whether the later code change can be implemented on the first reference code version. If the later code change cannot be implemented, the method 900 proceeds to 934. If the later code change can be implemented on the first reference version, at 938, the earlier code change being analyzed is marked as potentially interfering with the later code change for the particular object being analyzed, and the method proceeds to 934.

The method 900 determines whether the update chain and the earlier update are commutative. That is, does c[chain]+ v[k] give the same result as c[k]+v[chain]? At 934, it is determined whether an update chain can be implemented on the first reference version. An update chain can be the later code change and one or more earlier code changes identified as being necessary, or, in at least some cases, potentially interfering with the later code change. If the update chain cannot be applied to the first reference version, the earlier code change being analyzed can be added to the update chain at 942.

The method 900 then proceeds to decision 946, where it is determined whether the earlier code change includes additional objects to be analyzed. If the earlier code change includes additional objects to be analyzed, the method proceeds to 918 and another object is selected for analysis. If the earlier code change does not include additional objects to be analyzed, the method 900 proceeds to decision 950, where it is determined whether there are additional earlier code changes which should be analyzed. If additional code changes are to be analyzed, the method 900 proceeds to 914 and selects another earlier code change for analysis. If no more code changes are to be analyzed, the method 900 ends at 954.

If it was determined at 934 that the update chain can be implemented on the first reference code version, the method 900 proceeds to 958, where a second reference code version is determined by applying the earlier code change (c[k]) being analyzed to the first reference code version (producing version v[k]). In some cases, the second reference code version can be determined by applying the earlier code change being analyzed to the first reference code version. In other cases, the second reference code version can be retrieved, such as from the database 208 of FIG. 2.

At decision 962, it is determined whether the update chain can be implemented on the second reference code version. If the update chain cannot be implemented on the second reference code version, the earlier code change can be marked as potentially interfering or overlapping with the update chain at 966. In particular cases, the earlier code change can also be added to the update chain. In other cases, the earlier code change is not added to the update chain. After marking the earlier code change being analyzed as potentially interfering, the method 900 proceeds to decision 946 to determine whether additional objects are to be analyzed.

If the update chain could be implemented on the second reference code version at 962, the method proceeds to 970. At 970, a third reference code version is determined that includes the changes made by the update chain on the first reference code version (producing version v[chain]). In some cases, the third reference code version can be obtained by applying the update chain to the first reference code version. In other cases, the third reference code version can be retrieved, such as from the database 208 of FIG. 2.

At decision 974, it is determined whether the update chain can be implemented on the third reference code version. If the update chain cannot be implemented on the third reference code version, the earlier code change can be marked as potentially interfering or overlapping with the update chain at 978. In particular cases, the earlier code change can also be added to the update chain. In other cases, the earlier code change is not added to the update chain. After marking the earlier code chain being analyzed as potentially interfering, the method 900 proceeds to decision 946 to determine whether additional objects are to be analyzed.

If the earlier code change being analyzed could be implemented on the third reference code version at 974, the earlier code change is marked, for the object being analyzed, as independent of the update chain at 982. The earlier code change is typically not added to the update chain. In other cases, the earlier code change can be added to the update chain even though the earlier code chain is not required, or potentially interfering. The method 900 proceeds to decision 946 to determine whether additional objects are to be analyzed.

The method 900 can provide a number of advantages. By allowing for automated identification of code dependencies, the process of determining what earlier updates are needed for a later update can be greatly expedited, and potentially made more accurate. Thus, when an end user experiences a software error, the needed correction, and any necessary earlier corrections, can be more quickly identified, resolving the problem more quickly for the user. In addition, by examining the commutativity of updates, it can be determined whether two updates may potentially interfere with one another, potentially allow errors to be avoided, or their source identified if later discovered.

Example 7

Example Screen Displaying Code Dependency Information

Figure 10:
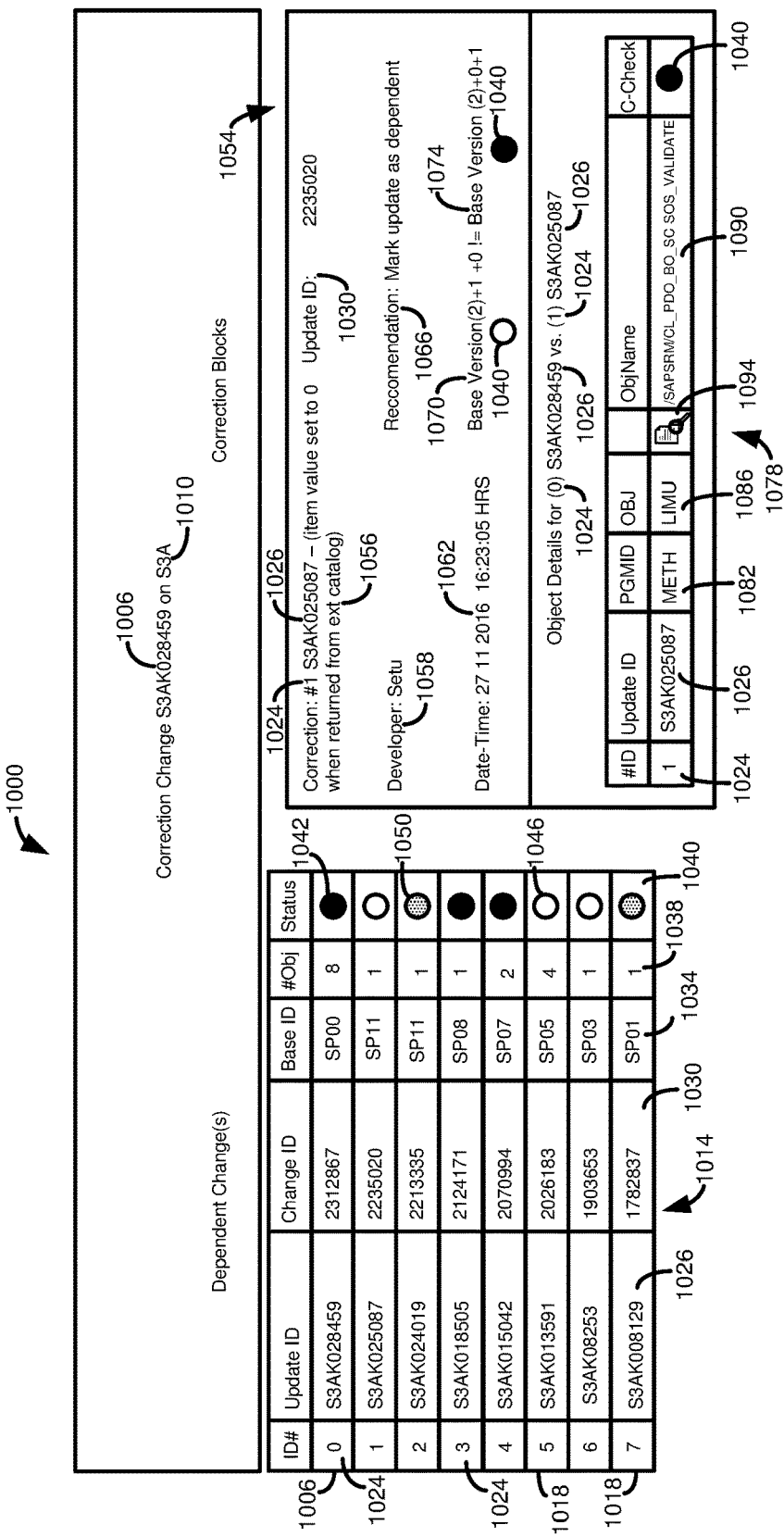
FIG. 10 is a diagram of an example screen for a user interface for a code comparison engine, displaying the results of a code comparison to determine code dependencies.

FIG. 10 is a diagram of an example screen 1000. The screen 1000 may be displayed, for example, using the user interface 254 of FIG. 2 and can display information associated with code versions, a later code change, and one or more earlier code changes to be analyzed for code dependencies. "Earlier" and "later" can have the meanings described above in Example 6.

The screen 1000 can include information regarding a particular update scenario being tested, including an identifier 1006 for the particular update being analyzed for code dependencies and an identifier 1010 for the computing system on which the update is being applied. A panel 1014 can display a list of potentially relevant updates 1018, as well the update 1006 being analyzed for code dependencies. For each of the updates 1006, 1018, the panel 1014 can an identifier 1024 that identifies the update in the list of updates.

In some cases, an update 1006, 1018 can be included in a package that includes other updates. The panel 1014 can include a package identifier 1026 (the identifier 1006 can be a package identifier for the particular update being analyzed for code dependencies), and an identifier 1030 that more specifically identifies the particular update 1006, 1018 in the computing system. As discussed above, in at least some cases, updates may be made on a particular base version of the software. When desirable, the panel 1014 can include a base version identifier 1034. A particular update 1006, 1018 may include updates to one or more software objects or feature. The number of software objects affected by an update 1006, 1018 can be indicated in field 1038.

When the updates 1006, 1018, have been analyzed for potential dependencies, the panel 1014 can include a dependency status identifier 1040. For example, in FIG. 10, dependent code changes, or updates, 1018 are shown with solid circles 1042, independent updates are shown with open circles 1046, and potentially interfering or overlapping updates are shown in shaded circles 1050. Of course, the dependency status of the updates 1006, 1018 can be indicated in a different manner, such as color coding (such as green for independent updates, red for dependent updates, and yellow for potentially interfering updates).

In some cases, the status identifiers 1040, and list of updates 1018, may be grouped by update (e.g., package). In at least some cases, an update 1018 can be given a particular status identifier 1040 based on an overall analysis of individual objects in the update 1018. For example, a later update 1018 may be marked as independent if no objects in the earlier update 1006 are dependent on any object in the later update 1018. Similarly, a later update 1018 may be marked as required if any object in the earlier update 1006 is dependent on an object modified in the later update. In such cases, a user may be given an option to view the dependency status of individual objects in the earlier update 1018. In other cases, the panel 1014 can display objects as individual entries in the update list, and provide status identifiers 1040 for specific objects in the earlier updates 1018.

A user may be allowed to select a particular update 1006, 1018 from the panel 1014 to obtain more information regarding the update, including information regarding any code dependencies or other code interactions. Information regarding the selected update 1006, 1018 can be presented in panel 1054. The panel 1054 can include one or more identifiers from the panel 1014, including the identifier 1024, the package identifier 1026, and the update identifier 1030. The panel 1054 can also include a description 1056 regarding the update package 1026 or the particular update 1030, such as a summary of an error being corrected or a summary of the changes being made in the code change. Information can be included regarding the identity 1058 of one or more developers associated with the update, as well as a time 1062 the update was created. A recommendation or summary 1066 can be provided for additional details regarding the dependency status of the updates 1006, 1018.

When the updates 1006, 1018 are non-commutative (or have been tested for commutativity), the panel 1054 can display dependency status identifiers 1040 for each of the implementation orders 1070, 1074.

A panel 1078 can include details for objects being compared between two updates 1006, 1018 or packages 1026. The panel 1078 can include one or more of the identifiers from the panel 1014, including the identifier 1024, the package identifier 1026, and the relevant status identifier 1040. The panel 1078 can include additional information, such as a program identifier 1082 and an object identifier 1086 to identify the program and object for which the dependency information is being displayed. A name or path identifier 1090 can be provided to display more information about the relevant object's name or location in a computing system. An icon 1094 can be provided to allow a user to obtain additional dependency information regarding the updates 1006, 1018, such as displaying code associated with a base software version, the earlier update 1018, or the update being analyzed 1006. In particular examples, areas of identical or differing code can be displayed to the user.

The example screen 1000 can provide a number of advantages. For example, a user may quickly determine what earlier updates may affect the same software objects updated by a later update. The user may also be given status information regarding such earlier updates, so the user may quickly determine which of the earlier updates are necessary for the installation of the later update, and which of the earlier updates may be potentially interfering.

Example 8

Figure 11:
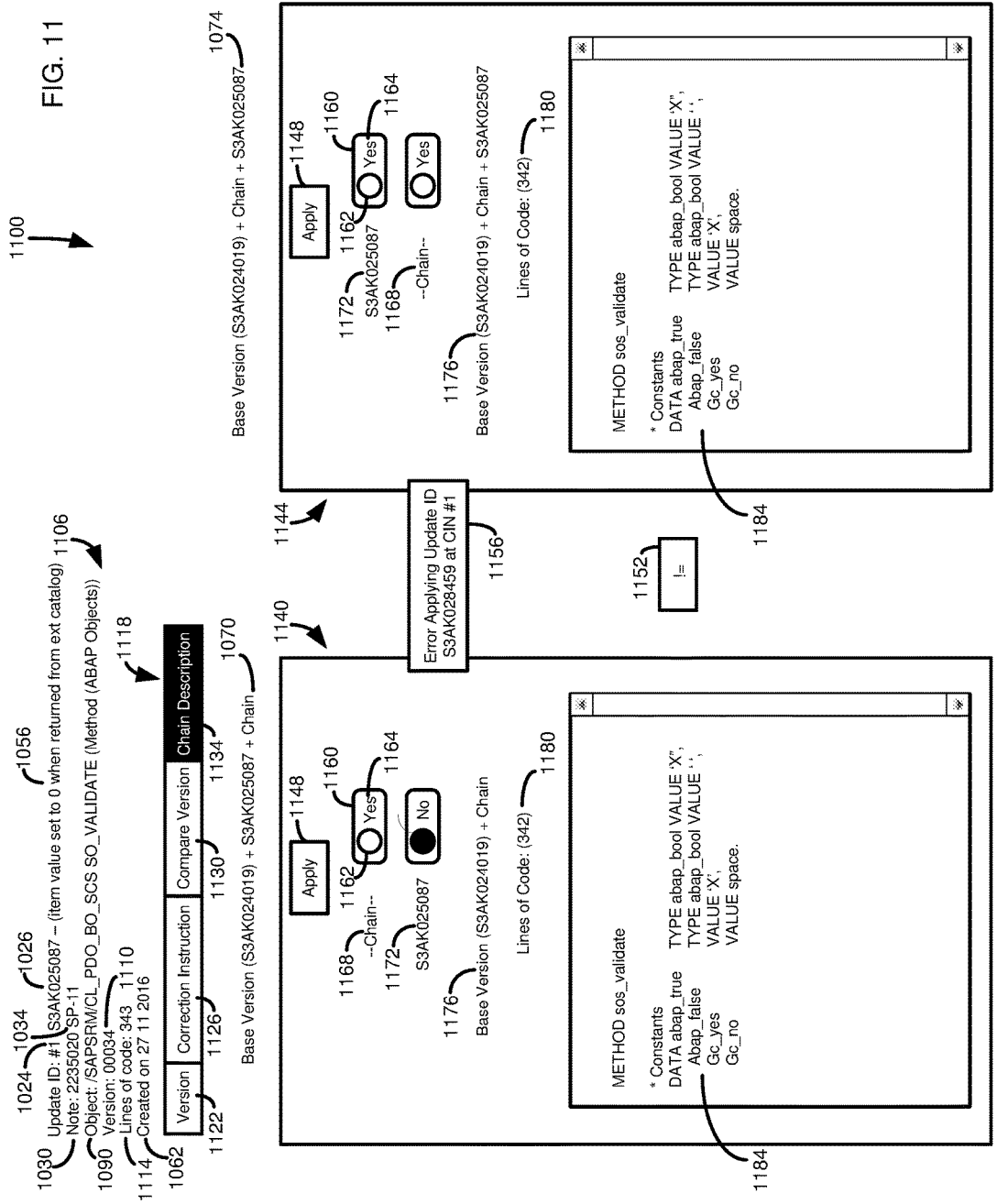
FIG. 11 is a diagram of an example screen for a user interface for a code comparison engine, displaying the results of user-selected code comparisons and code dependencies.

Example Screen Providing Dependency Information Regarding Selected Code Comparisons FIG. 11 is a diagram of an example screen 1100 that can be used to obtain information regarding the application of one or more test code versions on one or more reference code versions. The screen 1100 may be displayed, for example, using the user interface 254 of FIG. 2 and can display information associated with the test code versions, the reference code versions, or the results of implementing, or attempting to implement, the one or more test code versions on the one or more reference code versions.

The screen 1100 can include a block 1106 that includes information about a code version to be analyzed, such as an earlier code change that is being analyzed to determine whether a later, or prospective, code change is dependent on the earlier code change. The block 1106 can include identifier information for the earlier code change, such as the identifier 1024, the package identifier 1026, the change identifier 1030, the description 1056, the base version identifier 1034, the object identifier/path 1090, and the time the change was created or implemented 1062, as described above in the discussion of FIG. 10. The block 1106 can include additional information, including a version number 1110 associated with the software object and the number of lines of code 1114 in the object. The block 1106 can include more, less, or different information than shown.

A navigation bar 1118 can be provided to allow a user to view other types of information regarding potential code dependencies, or individual code versions, or to view information of the screen 1100 in a different format. For example, by selecting version tab 1122, the user can be presented with a screen that displays the source code, and optionally other information, regarding the code version to be analyzed. By selecting correction instruction tab 1126, a user may be presented with a screen displaying the changes made by a code change to a base or reference code version. For instance, the changes made be displayed as the context, delete, and insert blocks for the code change.

By selecting a compare version tab 1130, a user may be presented with a screen that shows code changes between two (or more) code versions. For example, changes to the code may be shown with visual indications of whether code is unchanged, deleted from a reference version, or added to a reference version. The visual indication can include using different fonts, formatting (e.g., normal text for unchanged code, strikethrough for deleted code, and underling for added code), color (such as showing the code in different colors or highlighted in different colors), other visual indications, and combinations thereof. In some cases, the user may be allowed to select the code versions being compared (e.g., the earlier change and the later change, the earlier change and the reference version, the later change and the reference version, the earlier and later changes and the reference version, the later change and the earlier change and reference version, etc.). The screen 1110 may be displayed by selecting the chain description tab 1134.

The screen 1100 can include a summary display 1140 for the implementation order 1070 and a summary display 1144 for the implementation order 1074. Each of the summary displays 1140, 1144 can include an apply icon 1148 which a user can select to try and implement (i.e., simulate) the code changes in the given implementation order 1070, 1074. A status indicator 1152 can be used to indicate whether the implementation can be successfully carried out. In this case, the status indicator 1152 indicates that an error was encountered when the implementation was attempted. The screen 1100 can display additional status information, such as a status message 1156. The status message 1156 can provide details regarding the status indicator 1152, such as information regarding the source of the error or problem, such as one or more update instructions that could not be executed.

The summary displays 1140, 1144 may provide code activation icons 1160 to allow a user to determine whether a particular code version should be included when implementation of code changes is attempted by selection of the apply icon 1148. The activation icons 1160 can include a graphical indication 1162 and a textual indication 1164 of whether a particular code version, such as a later update or an update chain that includes the later update 1168, or a selected earlier update 1172, are being included in the implementation attempt, such as attempted implementation on a base or reference code version. An implementation scenario 1176, representing the implementation actions selected by the activation icons 1160, can be displayed in the summary displays 1140, 1144.

The summary displays 1140, 1144 can include additional information regarding the implementation scenarios 1176. For example, the number of lines of code 1180 in the results of the implementation scenarios 1176 can be displayed. Source code 1184 associated with the implementation scenarios 1176 can also be displayed. In some examples, the source code 1184 can be the source code of a code version resulting from the implementation, optionally with an indication of any errors encountered during the implementation attempt. In other examples, the source code 1184 can be the source code of the reference version, the earlier change, the later change, the update chain, or a version that compares two or more of such code versions.

In further examples, the screen 1100, including the summary displays 1140, 1144 can include more, additional, or different information than that shown.

The example screen 1100 can provide a number of advantages. For example, by being able to select versions for comparison, the user can gain more insights into the dependency status of earlier and later updates. In addition, by being presented with the source code for the different versions, information regarding what changes have been made (e.g., insertions and deletions), and any failures or interferences, the user can quickly determine the source of differences between code versions, including the source of such failures or interferences.

Example 9

Dynamic Determination of Code Dependency During Code Creation

In some cases, code dependencies can be determined after a code change, such as a later update, has already been written. According to this Example 9, code changes can be determined while a code change is being written. For example, a developer may wish to determine whether a particular code change they are working on will require, or potentially conflict with, other code changes.

A user may be allowed to select one or more earlier code versions against which to test the code they are writing (or otherwise evaluating). For example, the user may select a base or reference code version. The user may be allowed to select one or more earlier code updates against which to test the code they are writing. In some cases, selecting an earlier code update may determine the reference code version to be used. According to a particular aspect, the user may be allowed to create and test a chain of code changes that includes the code they are writing and one or more earlier updates.

By selecting an appropriate interface element, the user can cause the implementation to be attempted or simulated. The user can then be provided with the results of the attempted implementation, including one or more of whether the code (including the code as part of a larger update) the user is writing can be implemented on one or more reference code versions, code dependencies (including potential interference) between the code being written and other code versions, and information regarding any potential conflicts or dependencies, such as information regarding any conflicts or sources of implementation failure, source code of a reference or earlier changed code version, code comparisons between two or more code versions (optionally including the code being written), or combinations thereof.

In some cases, by identifying potential code dependencies or conflicts during the writing of a code change, a user may be able to confirm that the code has acceptable behavior (e.g., a desired level of independence or implementability). If the code does not behave acceptably, such as by producing a conflict with an earlier code change, the user may attempt to accomplish the programming task (such as fixing an error or adding functionality) in another manner than potentially may avoid the undesired interaction with an earlier code version.

Example 10

Computing Systems

Figure 12:
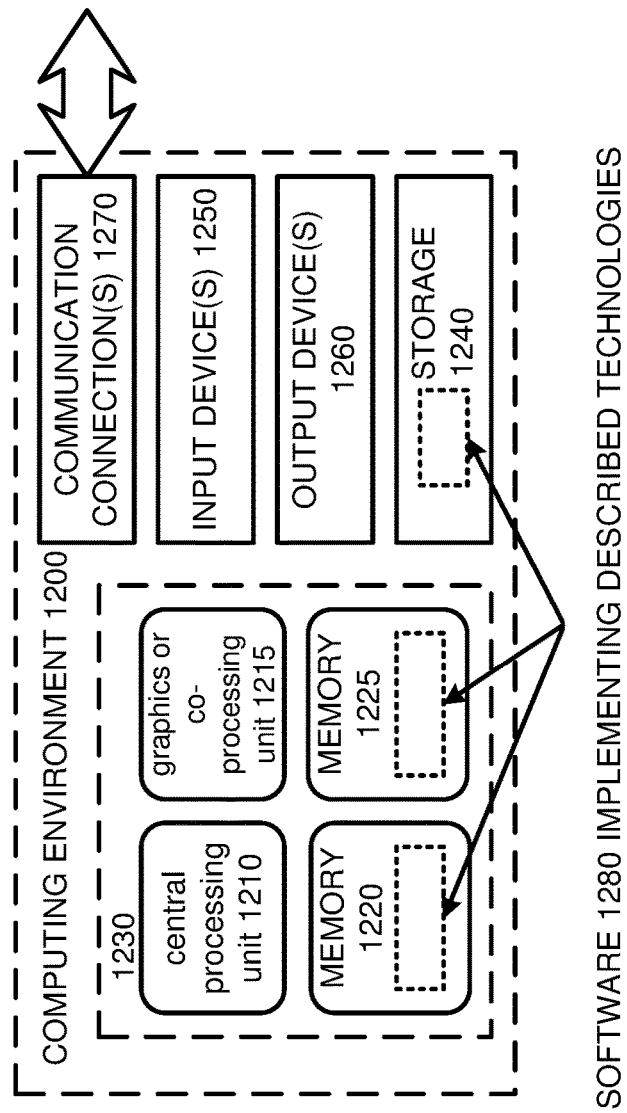
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing a comparison engine, such as described in Example 2, and used in the methods described in Examples 3-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s)

1210, 1215. The memory 1220, 1225, may also store database data, such as data associated with the database 208 of FIG. 2.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11

Cloud Computing Environment

Figure 13:
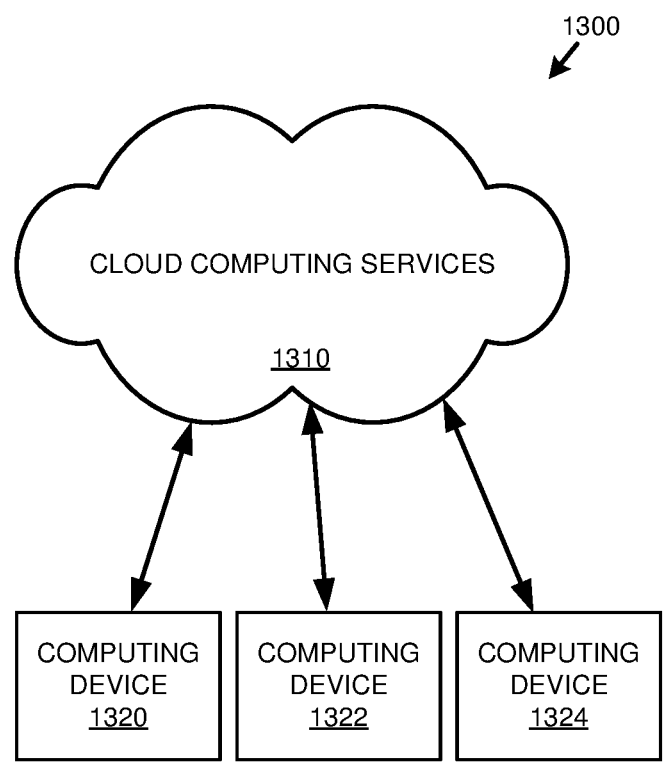
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 12

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform processing to identify a code relationship between code versions, the processing comprising:
receiving a first code update to a first code version, the first code update comprising at least a first code change, the at least a first code change being specified by (1) operations to locate a code segment to be changed; and one or more of (2) operations to modify the located code segment or code proximate the located code segment; (3) operations to remove code from the located code segment or code proximate the located code segment; or (4) operations to add code to the located code segment or code proximate the located code segment;
determining at least one software object changed by the first code update;
identifying a second code update of a plurality of code updates that modifies the at least one software object;
generating a second, code version, the second code version being a reference code version, by undoing at least the second code update, the second code update having been previously applied to the first code version, the second code update comprising at least a second code change:
the at least a second code change being specified by (1) operations to locate a code segment to be changed; and one or more of (2) operations to modify the located code segment or code proximate the located code segment; (3) operations to remove code from the located code segment or code proximate the located code segment; or (4) operations to add code to the located code segment or code proximate the located code segment;
wherein undoing the at least a second code change comprises one or more of (1) adding previously deleted code; (2) removing previously added code; or (3) reversing a previous code modification; and
determining whether the first code update can be implemented on the second version, the determining comprising attempting to apply the first code update to the second code version, and wherein it is determined that the first code update cannot be implemented on the second code version if the code segment to be changed cannot be located in the second code version.

2. The one or more non-transitory computer-readable storage media of claim 1, the processing further comprising:
determining whether the at least a first change of the first code update can be implemented on a third code version comprising the at least second code change of the second code update.

3. The one or more non-transitory computer-readable storage media of claim 2, the processing further comprising:
applying the at least a first code change of the first code update to the second code version to provide a fourth code version; and
determining whether the at least a second code change of the second code update can be applied to the fourth code version.

4. The one or more non-transitory computer-readable storage media of claim 3, the processing further comprising:
identifying the first and second code updates as independent if the at least a first code change of the first code update can be implemented on the third code version and the at least a second code change of the second code update can be applied to the fourth code version.

5. The one or more non-transitory computer-readable storage media of claim 3, the processing further comprising:
identifying the first and second code updates as potentially interfering if the at least a first code change of the first code update can be implemented on the third code version and the at least a second code change of the second code update cannot be applied to the fourth code version.

6. The one or more non-transitory computer-readable storage media of claim 2, the processing further comprising:
identifying the first and second code updates as potentially interfering if the at least a first code change of the first code update cannot be implemented on the third code version and the at least a second code change of the second code update can be applied to the fourth code version.

7. The one or more non-transitory computer-readable storage media of claim 2, the processing further comprising:
identifying the at least a first code change of the first code update as dependent on the at least a second code change of the second code update if the at least a first code change of the first code update cannot be implemented on the second code version.

8. The one or more non-transitory computer-readable storage media of claim 1, the processing further comprising:
identifying the at least a first code change of the first code update as potentially interfering with the at least a second code change of the second code update if the at least a first code change of the first code update cannot be implemented on the second code version.

9. The one or more non-transitory computer-readable storage media of claim 1, wherein determining whether the first code update can be implemented on the second code version comprises determining whether a chain of code updates that include the at least a first code change of the first code update can be implemented on the second code version.

10. The one or more non-transitory computer-readable storage media of claim 9, wherein the update chain includes at least a third code change made by a third code update.

11. The one or more non-transitory computer-readable storage media of claim 1, the processing further comprising:
generating the second code version by undoing the at least a second code change of the second code update.

12. The one or more non-transitory computer-readable storage media of claim 11, wherein the generating comprises interchanging insert and delete operations of the second code update.

13. The one or more non-transitory computer readable storage media of claim 12, wherein the generating further comprises identifying a code portion to be changed in a third code version using a context block.

14. The one or more non-transitory computer-readable storage media of claim 1, the processing further comprising:
displaying to a user a dependency status of the first code update relative to the second code update.

15. The one or more non-transitory computer-readable storage media of claim 1, wherein the dependency status can be dependent, independent, or potentially interfering.

16. The one or more non-transitory computer-readable storage media of claim 1, the processing further comprising:
receiving user input determining whether the first code update should be applied to the second code version and user input determining whether the second code update should be applied to the second code version.

17. A computing system that implements a code analysis system, the computing system comprising:
memory;
one or more processing units coupled to the memory; and
one or more non-transitory computer readable storage media storing instructions that, when loaded into the memory, cause the one or more processing units to perform operations for:
receiving a first code update having at least a first code change, the at least a first code change comprising information useable to locate a code segment to be changed and information specifying one or more of code to be added, deleted, or modified in or proximate the code segment to be located;
determining at least one software object changed by the first code update;
identifying a second code update of a plurality of code updates that modifies the at least one software object;
determining whether the first code update can be implemented on a first reference code version on which at least a second code change of the second code update has been undone, the second code update having been previously applied to the first code version and the at least a second code change comprising information useable to locate a code segment to be changed and information specifying one or more of code to be added, deleted, or modified in or proximate the code segment to be located, the determining comprising:
undoing the at least a second code change by one or more of (1) adding previously deleted code; (2) removing previously added code; or (3) reversing a previous code modification; and
attempting to locate the code segment to be changed in the first code update, and wherein it is determined that the first code update cannot be implemented on the first reference code version if the code segment to be changed cannot be located;
determining whether an update chain comprising the first code update and a third code update having at least a third code change can be implemented on the first reference code version;
determining whether the update chain can be implemented on a second reference code version comprising the at least a second code change of the second code update; and
determining whether the at least a second code change of the second code update can be implemented on a third reference code version comprising code changes of the update chain.

18. The computing system of claim 17, the operations further comprising:
displaying to a user a dependency status of the first code update relative to the second code update.

19. In a computing system comprising a memory and one or more processors, a method of determining potential code dependencies, the method comprising:
receiving a first code update to a first code version;
determining at least one software object changed by the first code update, the first code update comprising at last a first code change, the at least a first code change being specified by (1) operations to locate a code segment to be changed in the at least one software object; and one or more of (2) operations to modify the located code segment or code proximate the located code segment; (3) operations to remove code from the located code segment or code proximate the located code segment; or (4) operations to add code to the located code segment or code proximate the located code segment;
determining a plurality of second code updates modifying the at least one software object, a given code update of the plurality of second code updates comprising at least a second code change specified by (1) operations to locate a code segment to be changed; and one or more of (2) operations to modify the located code segment or code proximate the located code segment; (3) operations to remove code from the located code segment or code proximate the located code segment; or (4) operations to add code to the located code segment or code proximate the located code segment; and for each of the plurality of second code updates, determining whether an update chain comprising the first code update and at least one second code update of the plurality of second code updates can be implemented on a reference code version on which the at least a second code change of another second code update of the plurality of second code updates has been undone, the determining comprising attempting to apply code updates of the update chain on the reference code version, and wherein it is determined that an update of the update chain cannot be implemented on the reference code version if a respective code segment to be changed cannot be located in the reference code version using location identification information included in a respective code update of the update chain, wherein undoing the at least a second code change comprises one or more of (1) adding previously deleted code; (2) removing previously added code; or (3) reversing a previous code modification.

20. The method of claim 19, further comprising:
displaying to a user dependency statuses of the first code update relative to the plurality of second code updates.

* * * * *